US 8,708,475 B2

(12) United States Patent
Hasegawa et al.

(10) Patent No.: US 8,708,475 B2
(45) Date of Patent: Apr. 29, 2014

(54) ULTRAVIOLET CROSSLINKING INKJET INK, INK CARTRIDGE CONTAINING SAME, AND IMAGE FORMING METHOD AND APPARATUS USING SAME

(75) Inventors: Tomoko Hasegawa, Ibaraki (JP); Tamotsu Aruga, Saitama (JP); Okitoshi Kimura, Kanagawa (JP); Eiji Noda, Kanagawa (JP); Shinya Seno, Kanagawa (JP); Noriyasu Takeuchi, Kanagawa (JP); Masayuki Koyano, Kanagawa (JP); Soh Noguchi, Kanagawa (JP); Takao Hiraoka, Kanagawa (JP); Tsutomu Maekawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/313,687

(22) Filed: Dec. 7, 2011

(65) Prior Publication Data

US 2012/0147103 A1 Jun. 14, 2012

(30) Foreign Application Priority Data

Dec. 14, 2010 (JP) .................................. 2010-278177
Nov. 8, 2011 (JP) .................................. 2011-244715

(51) Int. Cl.
*G01D 11/00* (2006.01)

(52) U.S. Cl.
USPC ........................................................ 347/100

(58) Field of Classification Search
USPC ............ 347/100, 102; 427/542, 558; 264/447
See application file for complete search history.

(56) References Cited

U.S. PATENT DOCUMENTS

| 4,554,555 | A | 11/1985 | Aruga et al. |
| 4,581,071 | A | 4/1986 | Akutsu et al. |
| 4,620,876 | A | 11/1986 | Fujii et al. |
| 4,631,085 | A | 12/1986 | Kawanishi et al. |
| 4,647,310 | A | 3/1987 | Shimada et al. |
| 4,711,668 | A | 12/1987 | Shimada et al. |
| 4,713,113 | A | 12/1987 | Shimada et al. |

(Continued)

FOREIGN PATENT DOCUMENTS

| CN | 101432374 A | 5/2009 |
| CN | 101903476 A | 12/2010 |

(Continued)

OTHER PUBLICATIONS

Masahiro Takeyoshi, "Current Status and Novel Methodology for Detecting Skin Sensitization Potential of Chemicals", reported in Functional Materials, vol. 25, No. 9, Sep. 2005, 12 pages.

(Continued)

*Primary Examiner* — Anh T. N. Vo
(74) *Attorney, Agent, or Firm* — Oblon, Spivak, McClelland, Maier & Neustadt, L.L.P.

(57) ABSTRACT

An ultraviolet crosslinking inkjet ink including a radically polymerizable monomer including a methacrylate and no acrylate; and a photoradical generator. An ink cartridge including the ultraviolet crosslinking inkjet ink and a container containing the ultraviolet crosslinking inkjet ink therein. An image forming method including ejecting droplets of the ultraviolet crosslinking inkjet ink toward a recording material to form an image on the recording material; and irradiating the image with ultraviolet light to crosslink the image. An image forming apparatus including a recording device to eject droplets of the ultraviolet crosslinking inkjet ink toward a recording material to form an image on the recording material; and an ultraviolet irradiator to irradiate the image with ultraviolet light to crosslink the image.

10 Claims, 2 Drawing Sheets

(56) References Cited

U.S. PATENT DOCUMENTS

| | | |
|---|---|---|
| 4,737,190 A | 4/1988 | Shimada et al. |
| 4,793,860 A | 12/1988 | Murakami et al. |
| 5,622,550 A | 4/1997 | Konishi et al. |
| 5,810,915 A | 9/1998 | Nagai et al. |
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,106,602 A | 8/2000 | Ouchi et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,613,136 B1 | 9/2003 | Arita et al. |
| 6,688,737 B2 | 2/2004 | Nagai et al. |
| 6,695,443 B2 | 2/2004 | Arita et al. |
| 6,730,155 B2 | 5/2004 | Gotoh et al. |
| 6,786,588 B2 | 9/2004 | Koyano et al. |
| 6,799,845 B2 | 10/2004 | Kaneko et al. |
| 7,033,013 B2 | 4/2006 | Koyano et al. |
| 7,638,198 B2 * | 12/2009 | Itakura et al. .............. 428/425.8 |
| 7,713,462 B2 * | 5/2010 | Hayata et al. ................. 264/447 |
| 7,919,544 B2 | 4/2011 | Matsuyama et al. |
| 7,950,793 B2 | 5/2011 | Aruga et al. |
| 8,044,114 B2 | 10/2011 | Habashi et al. |
| 8,211,508 B2 * | 7/2012 | Hayata .......................... 427/542 |
| 2007/0197685 A1 | 8/2007 | Aruga et al. |
| 2008/0273045 A1 | 11/2008 | Morohoshi et al. |
| 2009/0162569 A1 | 6/2009 | Morohoshi et al. |
| 2009/0186162 A1 | 7/2009 | Namba et al. |
| 2010/0196601 A1 | 8/2010 | Goto et al. |
| 2010/0196602 A1 | 8/2010 | Koyano et al. |
| 2011/0057981 A1 | 3/2011 | Aruga et al. |
| 2011/0060100 A1 | 3/2011 | Kimura et al. |

FOREIGN PATENT DOCUMENTS

| | | |
|---|---|---|
| JP | 58-183765 | 10/1983 |
| JP | 58-183766 | 10/1983 |
| JP | 58-183767 | 10/1983 |
| JP | 59-36174 | 2/1984 |
| JP | 59-133273 | 7/1984 |
| JP | 59-147065 | 8/1984 |
| JP | 59-155089 | 9/1984 |
| JP | 8-302263 | 11/1996 |
| JP | 2003-192943 | 7/2003 |
| JP | 2005-29632 | 2/2005 |
| JP | 2011207993 | * 10/2011 ................. B41J 2/01 |

OTHER PUBLICATIONS

Combined Office Action and Search Report issued Oct. 15, 2013 in Chinese Patent Application No. 201110421587.X (with English translation of category of cited documents).

* cited by examiner

ULTRAVIOLET CROSSLINKING INKJET INK, INK CARTRIDGE CONTAINING SAME, AND IMAGE FORMING METHOD AND APPARATUS USING SAME

CROSS-REFERENCE TO RELATED APPLICATIONS

This patent application is based on and claims priority pursuant to 35 U.S.C. §119 to Japanese Patent Applications Nos. 2010-278177 and 2011-244715, filed on Dec. 14, 2010 and Nov. 8, 2011, respectively in the Japan Patent Office, the entire disclosure of which is hereby incorporated herein by reference.

FIELD OF THE INVENTION

The present invention relates to an ultraviolet crosslinking inkjet ink. In addition, the present invention also relates to an ink cartridge containing the ultraviolet crosslinking inkjet ink, and to an image forming method and an image forming apparatus using the ultraviolet crosslinking inkjet ink.

BACKGROUND OF THE INVENTION

Since inkjet image forming methods are simple and can produce images at low costs, the inkjet image forming methods have been used for various print industries. Among the inkjet image forming methods, methods using an ultraviolet crosslinking inkjet ink have advantages such that the ink is a quick drying ink (i.e., the ink can be dried in a short time); images can be formed on a recording material having little ink absorbability; and it is not necessary for a factory manufacturing an ultraviolet crosslinking inkjet ink to provide a facility for performing a toxic gas treatment so as to satisfy the toxic gas emission regulations. Further, since the content of a volatile organic component included in such an ultraviolet crosslinking inkjet ink is very low, the ink is environmentally friendly. Therefore, the inkjet image forming methods using an ultraviolet crosslinking ink have been broadly used.

Ultraviolet crosslinking inkjet inks for use in the inkjet image forming methods are broadly classified into radically polymerizable inks and cationically polymerizable inks. The radically polymerizable inks have an advantage over the cationically polymerizable inks such that the manufacturing costs are relatively low. Specifically, cationically polymerizable inks typically include a photo-acid-generating agent as a polymerization initiator to generate a strong acid upon receipt of light. However, since such photo-acid-generating agents have a complex chemical formula, the photo-acid-generating agents are not broadly used, and are therefore very expensive. Therefore, cationically polymerizable inks have relatively high manufacturing costs compared to radically polymerizable inks. In addition, photo-acid-generating agents generate a small amount of strong acid with elapse of time even when being preserved in a dark place. Therefore, ink flow passages of image forming apparatus using such a cationically polymerizable ink have to have good resistance to acids, and therefore the material used for the ink flow passages is limited.

In contrast, since photo-radical-generating agents (hereinafter referred to as photoradical generators) for use in the radically polymerizable inks have been broadly used, the photoradical generators have relatively low costs. In addition, since photoradical generators do not generate a strong acid, the radically polymerizable inks have good stability even when being used or preserved over a long time, and there is no limitation on the material of the ink flow passages.

Conventional radically polymerizable ultraviolet crosslinking inks typically use, as a radically polymerizable monomer, an acrylate, which has such advantages as to have a relatively low viscosity and to be easily crosslinked with a small amount of light.

However, acrylates typically have a high skin irritation potential and a high skin sensitization potential.

For these reasons, the inventors recognized that there is a need for a radically polymerizable ultraviolet crosslinking inkjet ink which has a high level of safety without using an acrylate and which can be easily crosslinked with a small amount of light.

BRIEF SUMMARY OF THE INVENTION

As an aspect of the present invention, an ultraviolet crosslinking inkjet ink is provided which includes a radically polymerizable monomer and a photoradical generator.

The radically polymerizable monomer includes a methacrylate and no acrylate.

As another aspect of the present invention, an ink cartridge is provided which includes the ultraviolet crosslinking inkjet ink mentioned above, and a container to contain the ultraviolet crosslinking inkjet ink.

As yet another aspect of the present invention, an image forming apparatus is provided which includes a recording device to eject droplets of the ultraviolet crosslinking inkjet ink mentioned above toward a recording material to form an image on the recording material; and an ultraviolet irradiator to irradiate the image with ultraviolet light to crosslink the image.

As a further aspect of the present invention, an image forming method is provided which includes ejecting droplets of the ultraviolet crosslinking inkjet ink mentioned above toward a recording material to form an image on the recording material; and irradiating the image with ultraviolet light to crosslink the image.

The aforementioned and other aspects, features and advantages will become apparent upon consideration of the following description of the preferred embodiments taken in conjunction with the accompanying drawings.

DETAILED DESCRIPTION OF THE INVENTION

As mentioned above, acrylates typically have a high skin irritation potential and a high skin sensitization potential. In this regard, acrylates have a larger SI value, and a larger PII value than methacrylates, wherein SI is Stimulation Index and represents the skin sensitization potential, and PII is Primary Irritation Index and represents the skin irritation potential. Although the SI value and PII value will be described later in detail, it is preferable for a material to have as small SI and PII values as possible because the material has lower toxicity.

Therefore, the present inventors consider that it is preferable to use methacylates as radically polymerizable monomers for ultraviolet crosslinking inkjet inks instead of acryaltes, and have investigated ultraviolet crosslinking inkjet inks using a methacrylate instead of an acrylate.

Initially, the ultraviolet crosslinking inkjet ink of the present invention will be described in detail.

Inkjet image forming methods include forming ink droplets; directly ejecting the ink droplets toward a recording material such as paper sheets to form an image (such as characters and figures) on the recording material. The ultraviolet crosslinking inkjet ink of the present invention is used for inkjet image forming apparatuses, and includes a radically polymerizable monomer and a photoradical generator. The radically polymerizable monomer includes a methacrylate and no acrylate. The ultraviolet crosslinking inkjet ink of the present invention optionally includes a colorant.

The ultraviolet crosslinking inkjet ink of the present invention can include other radically polymerizable monomers than methacrylates except for acrylates. However, it is preferable that the radically polymerizable monomer included in the ink consists essentially of one or more methacrylates.

Specific examples of the methacrylates for use as the radically polymerizable monomer include γ-butyrolactone methacrylate, tricyclodecane dimethanol dimethacryalte, polyethylene glycol (400) dimethacrylate, polyethylene glycol (600) dimethacrylate, trimethylolpropane trimethacrylate, ethylene oxide (EO)/propylene oxide (PO) modified trimethylolpropane trimethacrylate, (2-methyl-2-isobutyl-1,3-dioxolan-4-yl) methacrylate, trifluoroethyl methacrylate, caprolactone-modified 2-(methacryloyloxy)ethyl phosphate, phenoxyethyl methacrylate, glycerin dimethacrylate, methoxydiethylene glycol methacrylate, methoxytetraethylene glycol methacrylate, EO/PO modified methacrylate phosphate, diethylene glycol dimethacrylate, dicyclopentenyloxyethyl methacrylate, dicyclopentanyl methacrylate, 1,4-butanediol dimethacrylate, 1,6-hexanediol dimethacrylate, ethylene glycol dimethacrylate, tetraethylene glycol dimethacrylate, 2-hydroxy-1,3-dimethacryloxypropane, neopentyl glycol dimethacrylate, EO/PO modified bisphenol A methacrylate, EO/PO modified dimethacrylate phosphate, polyethylene glycol (200) dimethacrylate, polytetramethylene glycol dimethacrylate, trimethylolpropane methacrylate benzoate, polyethylene glycol (1000) dimethacrylate, dipropylene glycol dimethacrylate, tripropylene glycol dimethacrylate, polypropylene glycol (400) dimethacrylate, polypropylene glycol (700) dimethacrylate, EO/PO modified bisphenol A dimethacrylate, EO/PO modified 1,6-hexanediole dimethacrylate, dipentaerythritol hexamethacrylate, EO/PO modified tetramethylolmethane tetramethacrylate, caprolactone modified dipentaerythritol hexamethacrylate, dipentaerythritolhydroxy pentamethacrylate, caprolactone modified dipentaerythritolhydroxy pentamethacrylate, ditrimethylolpropane tetramethacrylate, pentaerythritol tetramethacrylate, pentaerythritol trimethacrylate, tris(2-hydroxyethyl)isocyanurate trimethacrylate, EO/PO modified neopentyl glycol dimethacrylate, propoxydized neopentyl glycol dimethacrylate, propoxydized glyceryl trimethacrylate, polyester dimethacrylate, polyester trimethacrylate, polyester tetramethacrylate, polyester pentamethacrylate, polyester hexamethacrylate, polyurethane dimethacrylate, polyurethane trimethacrylate, polyurethane tetramethacrylate, polyurethane pentamethacrylate, polyurethane hexamethacrylate, 1,3-butylene glycol dimethacrylate, 2-ethylhexyl methacrylate, 2-hydroxy-3-acryloyloxypropyl methacrylate, 2-hydroxy-3-methacryloxypropyltrimethylammonium chloride, 2-hydroxybutyl methacrylate, 2-hydroxyethyl methacrylate, alkyl methacrylate, aryl methacrylate, benzyl methacrylate, butoxyethyl methacrylate, butyl methacrylate, cetyl methacrylate, cyclohexyl methacrylate, diethylaminoethyl methacrylate, dimethylaminoethyl methacrylate, ethyl methacrylate, glycerol polymethacrylate, glycidyl methacrylate, hexafluoropropyl methacrylate, isobornyl methacrylate, isobutyl methacrylate, isodecyl methacrylate, lauroxypolyethylene glycol methacrylate, lauryl methacrylate, methoxypolyethylene glycol methacrylate, nonylphenoxypoly(ethylene glycol—propylene glycol) methacrylate, nonylphenoxypolyethylene glycol methacrylate, nonylphenoxypolypropylene glycol methacrylate, octafluoropentyl methacrylate, octoxypolyethylene glycol—polypropylene glycol methacrylate, pentamethylpiperidyl methacrylate, perfluorooctylethyl methacrylate, methacrylate of EO/PO modified phthalic acid, dimethacrylate of EO/PO modified phthalic acid, polyethylene glycol—polypropylene glycol methacrylate, poly(ethylene glycol—tetramethylene glycol) methacrylate, poly(propylene glycol—tetramethylene glycol) methacrylate, polyethylene glycol methacrylate, polypropylene glycol methacrylate, sodium 2-sulfoethylmethacrylate, stearoxypolyethylene glycol methacrylate, stearyl methacrylate, isostearyl methacrylate, methacrylate of EO/PO modified succinic acid, t-butylcyclohexyl methacrylate, t-butyl methacrylate, n-pentyl methacrylate, n-hexyl methacrylate, tetrafluoropropyl methacrylate, tetrahydrofurfuryl methacrylate, tetramethylpiperidyl methacrylate, tribromophenyl methacrylate, tridecyl methacrylate, behenyl methacrylate, γ-methacryloxytrimethoxy silane, polyethylene glycol dimethacrylate, 2-(2-vinyloxyethoxyethyl)methacrylate, 2-methyl-2-adamantyl methacrylate, 2-ethyl-2-adamantyl methacrylate, 1,9-nonanediol dimethacrylate, 1,10-decanediol dimethacrylate, aryloxypolyethylene glycol methacrylate, EO/PO modified bisphenol A dimethacrylate, PO/tetramethylene oxide modified bisphenol A dimethacrylate, epichlorohydrin modified glycerol dimethacrylate, epichlorohydrin modified phenoxy dimethacrylate, polytetramethylene glycol dimethacrylate, polyethylene glycol dimethacrylate, epichlorohydrin modified polyethylene glycol methacrylate, epichlorohydrin modified polyethylene glycol dimethacrylate, EO/PO modified bisphenol A diglycidyl ether dimethacrylate, triethylene glycol dimethacrylate, EO modified tetrabromobisphenol A dimethacrylate, EO/PO modified polypropylene glycol dimethacrylate, HPA (alkylene) modified trimethylolpropane dimethacrylate, HPA (alkylene) modified trimethylolpropane trimethacrylate, and the like.

These radically polymerizable monomers can be used alone or in combination.

When the above-mentioned methacrylates are used for the ultraviolet crosslinking inkjet ink of the present invention, methacrylates having a small stimulation index (SI) value are preferably used. Specifically, methacrylates having a SI value of less than 3, preferably less than 2, and more preferably less than 1.6, which is determined by the LLNA method mentioned later, are preferably used because of having a good skin sensitization property.

Among the above-mentioned methacrylates, specific examples of polyfunctional methacrylates having a SI value of less than 3 include tricyclodecane dimethanol dimethacrylate, polyethylene glycol dimethacrylate having the below mentioned formula (I) (n is preferably from 9 to 14) such as polyethylene glycol (400) dimethacrylate (n is about 9) and polyethylene glycol (600) dimethacrylate (n is about 14), trimethylolpropane trimethacrylate, neopentyl glycol dimethacrylate, and the like, and specific examples of monofunctional methacrylates having a SI value of less than 3 include γ-butyrolactone methacrylate, t-butyl methacrylate, n-pentyl methacrylate, n-hexyl methacrylate, and the like.

(1)

It is preferable to use one or more polyfunctional monomers selected from tricyclodecane dimethanol dimethacrylate, polyethylene glycol (400) dimethacrylate, polyethylene glycol (600) dimethacrylate, trimethylolpropane trimethacryalte, and neopentyl glycol dimethacrylate for the radically polymerizable monomer, because the resultant inkjet ink has a good combination of skin sensitization property and crosslinking ability. It is also preferable to use one or more monofunctional monomers selected from γ-butyrolactone methacrylate, t-butyl methacrylate, n-pentyl methacrylate, and n-hexyl methacrylate in combination with one or more of the polyfunctional monomers mentioned above.

The ultraviolet crosslinking inkjet ink of the present invention includes a photoradical generator so as to be crosslinked by light. Specific examples of such a photoradical generator include benzophenone, bis(2,4,6-trimethylbenzoyl)-phenylphosphine oxide, 1-hydroxycyclohexyl phenyl ketone, 2-methyl-1-[4-(methylthio)phenyl]-2-morphorinopropane-1-one, 2-dimethylamino-2-(4-methylbenzyl)-1-(4-morphorino-4-yl-phenyl)butane-1-one, 2-hydroxy-2-methyl-1-phenylpropane-1-one, 2-benzyl-2-dimethylamino-1-(4-morphorinophenyl)butanone-1, 2,2-dimethoxy-1,2-diphenylethane-1-one, 1,2-octanedione[4-(phenylthio)-2-(o-benzoyloxime)], bis(2,6-dimethoxybenzoyl)-2,4,4-trimethylpentylphosphine oxide, 2,4,6-trimethylbenzoylphosphine oxide, 2,4-diethylthioxanthone, 2-chlorothioxanthone, isopropylthioxanthone, [4-(methylphenylthio)phenyl]phenylmethanone, and the like. These compounds can be used alone or in combination.

The added amount of a photoradical generator in the ultraviolet crosslinking inkjet ink of the present invention is preferably not less than 5 parts by weight and less than 30 parts by weight, based on 100 parts by weight of the radically polymerizable monomer component included in the ink. When the added amount is less than 5 parts by weight, a case can occur in which the resultant ink cannot be easily crosslinked. In contrast, when the added amount is not less than 30 parts by weight, a case can occur in which the photoradical generator cannot be well dissolved in the radically polymerizable monomer component used, thereby damaging the ink ejecting nozzles used.

The ultraviolet crosslinking inkjet ink of the present invention optionally includes a colorant. Specific examples of black colorants include carbon blacks prepared by any known methods such as furnace methods and channel methods.

Specific examples of yellow colorants include Pigment Yellows such as Pigment Yellows 1, 2, 3, 12, 13, 14, 16, 17, 73, 74, 75, 83, 93, 95, 97, 98, 114, 120, 128, 129, 138, 150, 151, 154, 155, and 180.

Specific examples of magenta colorants include Pigment Reds such as Pigment Reds 5, 12, 48 (Ca), 48 (Mn), 57 (Ca), 57:1, 112, 122, 123, 168, 184, and 202, and Pigment Violets such as Pigment Violet 19.

Specific examples of cyan colorants include Pigment Blues such as Pigment Blues 1, 2, 3, 15, 15:3, 15:4, 16, 22, and 60, and Vat Blues such as Vat Blues 4 and 60.

Specific examples of white colorants include sulfates of alkaline earth metals such as barium sulfate; carbonates of alkaline earth metals such as calcium carbonate; silicas such as silicates and synthesized silicates; and other materials such as calcium silicate, alumina, hydrated alumina, titanium oxide, zinc oxide, talc, and clay.

Other colorants such as inorganic or organic pigments and can also be used for the ultraviolet crosslinking inkjet ink of the present invention in consideration of the physical properties thereof.

The ultraviolet crosslinking inkjet ink of the present invention is preferably used in a form of an ink cartridge in which the ultraviolet crosslinking inkjet ink of the present invention is contained in a container, so that hands and cloths are not contaminated by the ink in an ink exchange operation, and the ink is prevented from being mixed with dust.

The container of the ink cartridge is not particularly limited, and the shape, structure, size and constituent material of the container are properly determined so that the container fulfills the needs. For example, ink bags made of a material such as aluminum-laminated films and resin films can be preferably used for the container.

An example of the ink cartridge will be described by reference to FIGS. 1 and 2.

Figure 1:
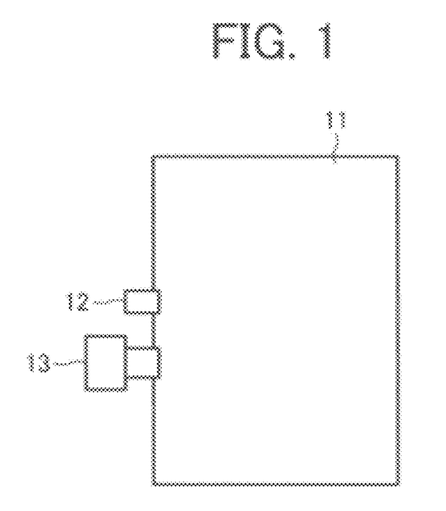
FIG. 1 is a schematic view illustrating an ink bag for use in the ink cartridge of the present invention.
Figure 2:
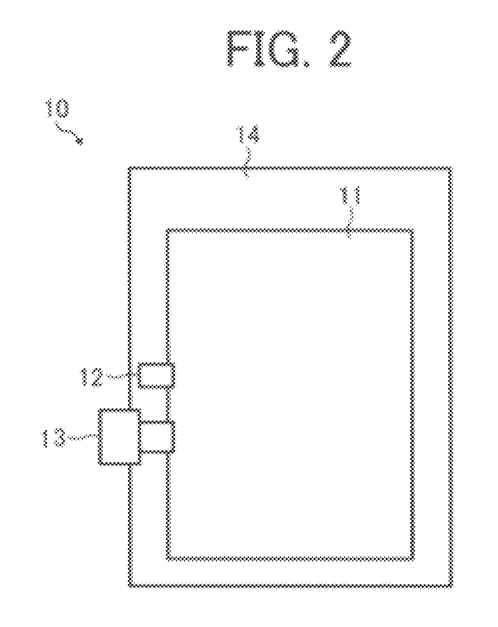
FIG. 2 is a schematic view illustrating an example of the ink cartridge of the present invention, which includes the ink bag illustrated in FIG. 1.

FIG. 1 is a schematic view illustrating an ink bag 11 containing an ultraviolet crosslinking inkjet ink of the present invention, and FIG. 2 is a schematic view illustrating an ink cartridge 10 containing the ink bag 11 therein.

Referring to FIG. 1, an ultraviolet crosslinking inkjet ink of the present invention is injected into the ink bag 11 from an inlet 12. After discharging air from the ink bag 11, the inlet 12 is closed by welding or the like. When the ink bag 11 is used, the ink bag 11 is set in an inkjet printer so that a needle of the inkjet printer is inserted into an ink outlet 13 of the ink bag 11. The ink outlet 13 is made of a rubber or the like. The material constituting the ink bag 11 is preferably a material having little air permeability such as aluminum-laminated films.

As illustrated in FIG. 2, the ink bag 11 is contained in a cartridge case 14 typically made of a plastic. The ink cartridge 10 is detachably attached to an inkjet printer.

The ink cartridge of the present invention is preferably used for an image forming apparatus of the present invention such as the below-mentioned inkjet printer. By using such an ink cartridge for the image forming apparatus of the present invention, the ink exchanging or replenishing operation can be easily performed, resulting in enhancement of the workability in the operations.

Next, the image forming apparatus of the present invention will be described.

The image forming apparatus of the present invention includes a recording device to eject droplets of the ultraviolet crosslinking inkjet ink of the present invention to form an image on a recording material, and an ultraviolet irradiator to irradiate the image with ultraviolet light.

Specific examples of the inkjet recording methods include continuous ink ejecting methods, and on demand recording methods such as piezoelectric methods, thermal methods and electrostatic methods.

Figure 3:
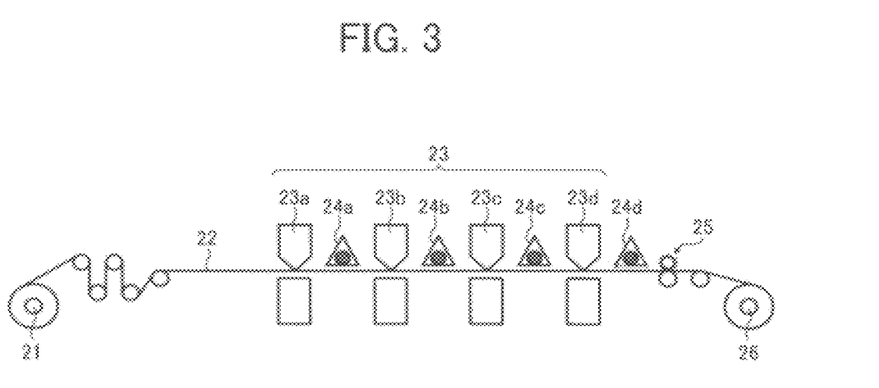
FIG. 3 is a schematic view illustrating an inkjet recording apparatus as an example of the image forming apparatus of the present invention.

FIG. 3 illustrates an inkjet recording apparatus as an example of the image forming apparatus of the present invention.

The inkjet recording apparatus illustrated in FIG. 3 includes a recording device 23 including a yellow recording unit 23a, a magenta recording unit 23b, a cyan recording unit 23c and a black recording unit 23d to respectively eject yellow, magenta, cyan and black inks, each of which is the ultraviolet crosslinking inkjet ink of the present invention, to form yellow, magenta, cyan and black color images on a recording material 22 fed from a roll-form recording material 21; and ultraviolet light sources 24a, 24b, 24c and 24d serving as ultraviolet irradiators to irradiate the yellow, magenta, cyan and black color images with ultraviolet light to crosslink the color images. In this inkjet recording apparatus illustrated in FIG. 3, an ultraviolet crosslinking operation is performed after every image forming operation. After the recording material 22 bearing crosslinked color images thereon is processed by a processor (such as a perforating device) 25, the recording material 22 is wound as a roll-form print 26.

Each of the recording units 23a-23d can have a heater to heat the inkjet ink at the ink ejecting portion thereof, so that the ink can be satisfactorily liquefied (i.e., the ink can have a proper viscosity).

When the former recorded image has a large image area proportion or the image is recorded at a high speed, the temperature of the recording material 22 may increase. In order to prevent increase in temperature of the recording material 22, a cooler to cool the recording material to about room temperature can be provided so that the cooler faces the upper or lower surface of the recording material 22 or is contacted therewith.

Specific examples of the recording material include paper, films, metals, and complex materials thereof. The recording material 22 has a roll form in the inkjet recording apparatus illustrated in FIG. 3, but the shape of the recording material 22 is not limited thereto. Recording materials having a sheet form and the like can also be used.

In the inkjet recording apparatus illustrated in FIG. 3, images are formed on one side of the recording material 22, but the image forming apparatus of the present invention is not limited thereto. The image forming apparatus may have such a configuration as to form images on both sides of the recording material 22.

When high speed image formation is performed, it is preferable to perform an ultraviolet crosslinking operation after every image forming operation, so that images with a better crosslinking property can be formed. However, it is possible that the ultraviolet light sources 24a, 24b and 24c are mildly operated or are not operated, and the light source 24d is operated so as to irradiate the recorded images with a sufficient amount of ultraviolet light. By using this method, energy saving and cost saving can be made.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The materials used for the following comparative example and examples are as follows.

1. Radically Polymerizable Monomers (1) Trimethylolpropane triacrylate: SR351 from Sartomer, which a PII*[1] of 3.0 (described in its catalogue). Trimethylolpropane triacrylate is a positive sensitization material as described in Directive 67/548/EEC Annex III (which can be accessed from Ariel Webinsight) that the material has a grade R43, which means that the material has a positive skin sensitization potential.

PII*[1]: PII (Primary Irritation Index) is an index of skin sensitizing property defined by OECD Test Guideline 404. When a material has a PII of less than 2, the material is defined as a material having a low skin sensitization potential. The PII value of a material is typically described in the Material Safty Data Sheet (MSDS) thereof.

(2) Trimethylolpropane trimethacrylate: SR350 from Sartomer, which has a SI value of 1.9 when determined by the below-mentioned LLNA method, and a PII value of 0.0 (described in its catalogue).

(3) Tricyclodecane dimethanol dimethacrylate: DCP from Shin-Nakamura Chemical Co., Ltd., which has a SI value of 1.3 when determined by the LLNA method mentioned below.

(4) Polyethylene glycol (400) dimethacrylate: LIGHT ESTER 9EG from Kyoeisha Chemical Co., Ltd., which has a SI value of 1.3 when determined by the LLNA method mentioned below, and has formula (I) in which n is about 9.

(5) Polyethylene glycol (600) dimethacrylate: LIGHT ESTER 14EG from Kyoeisha Chemical Co., Ltd., which has a SI value of 1.6 when determined by the LLNA method mentioned below, and has formula (I) in which n is about 14.

(6) γ-Butyrolactone methacrylate: GBLMA from Osaka Organic Chemical Industry Ltd., which has a SI value of 2.1 when determined by the LLNA method mentioned below.

(7) Neopentyl glycol dimethacrylate: NPG from Shin-Nakamura Chemical Co., Ltd., which has a SI value of 2.0 when determined by the LLNA method.

(8) t-Butyl methacrylate: LIGHT ESTER TB from Kyoeisha Chemical Co., Ltd. t-Butyl methacrylate has a negative skin sensitization potential as described in Contact Dermatitis 8 223-235 (1982), etc. when evaluated by a maximization method.

(9) n-Pentyl methacrylate: n-Amyl Methacrylate from Toyo Science Corp. n-Pentyl dimethacrylate has a negative skin sensitization potential as described in Contact Dermatitis 8 223-235 (1982), etc. when evaluated by a maximization method.

(10) n-Hexyl methacrylate: from Tokyo Kasei Kogyo Co., Ltd. n-Hexyl dimethacrylate has a negative skin sensitization potential as described in Contact Dermatitis 8 223-235 (1982), etc. when evaluated by a maximization method.

2. Photoradical Generator (1) 2-Methyl-1-[4-(methylthio)phenyl]-2-morphorinopropane-1-one: IRGACURE 907 from Chiba Japan, which has no skin sensitization potential as described in the MSDS thereof.

3. Colorant (1) Carbon black: mixture of carbon black #5 from Mitsubishi Chemical Corporation and a dispersant S32000 from The Lubrizol Corporation in a ratio of 3:1 by weight.

Comparative Example 1

The following components were mixed.

| | |
|---|---|
| Trimethylolpropane triacrylate (radically polymerizable monomer) | 100 parts |
| 2-Methyl-1-[4-(methylthio)phenyl]-2-morphorinopropane-1-one (photoradical generator) | 10 parts |

The mixture was agitated by an agitator to dissolve the photoradical generator in the radically polymerizable monomer.

Thus, an ultraviolet crosslinking inkjet ink of Comparative Example 1 was prepared.

Example 1

The following components were mixed.

| | |
|---|---|
| Trimethylolpropane trimethacrylate (radically polymerizable monomer) | 100 parts |
| 2-Methyl-1-[4-(methylthio)phenyl]-2-morphorinopropane-1-one (photoradical generator) | 10 parts |

The mixture was agitated by an agitator to dissolve the photoradical generator in the radically polymerizable monomer.

Thus, an ultraviolet crosslinking inkjet ink of Example 1 was prepared.

Example 2

The following components were mixed.

| | |
|---|---|
| Trimethylolpropane trimethacrylate (radically polymerizable monomer) | 100 parts |
| 2-Methyl-1-[4-(methylthio)phenyl]-2-morphorinopropane-1-one (photoradical generator) | 20 parts |

The mixture was agitated by an agitator to dissolve the photoradical generator in the radically polymerizable monomer.

Thus, an ultraviolet crosslinking inkjet ink of Example 2 was prepared.

Example 3

The following components were mixed.

| | |
|---|---|
| Tricyclodecane dimethanol dimethacrylate (radically polymerizable monomer) | 30 parts |
| Polyethylene glycol (600) dimethacrylate (radically polymerizable monomer) | 10 parts |
| γ-Butyrolactone methacrylate (radically polymerizable monomer) | 50 parts |
| Neopentyl glycol dimethacrylate (radically polymerizable monomer) | 10 parts |
| 2-Methyl-1-[4-(methylthio)phenyl]-2-morphorinopropane-1-one (photoradical generator) | 20 parts |

The mixture was agitated by an agitator to dissolve the photoradical generator in the radically polymerizable monomers.

Thus, an ultraviolet crosslinking inkjet ink of Example 3 was prepared.

Example 4

The following components were mixed.

| | |
|---|---|
| Tricyclodecane dimethanol dimethacrylate (radically polymerizable monomer) | 50 parts |
| Polyethylene glycol (400) dimethacrylate (radically polymerizable monomer) | 5 parts |
| t-Butyl methacrylate (radically polymerizable monomer) | 35 parts |
| n-Pentyl methacrylate (radically polymerizable monomer) | 5 parts |
| n-Hexyl methacrylate (radically polymerizable monomer) | 5 parts |
| 2-Methyl-1-[4-(methylthio)phenyl]-2-morphorinopropane-1-one (photoradical generator) | 20 parts |

The mixture was agitated by an agitator to dissolve the photoradical generator in the radically polymerizable monomers.

Thus, an ultraviolet crosslinking inkjet ink of Example 4 was prepared.

Example 5

The following components were mixed.

| | |
|---|---|
| Trimethylolpropane trimethacrylate (radically polymerizable monomer) | 100 parts |
| 2-Methyl-1-[4-(methylthio)phenyl]-2-morphorinopropane-1-one (photoradical generator) | 20 parts |
| Carbon black (colorant) | 3 parts |

The mixture was agitated by an agitator, and then subjected to a dispersing treatment using a supersonic dispersing machine, followed by filtering to prepare a black ink.

Thus, an ultraviolet crosslinking inkjet ink of Example 5 was prepared.

Example 6

The following components were mixed.

| | |
|---|---|
| Tricyclodecane dimethanol dimethacrylate (radically polymerizable monomer) | 50 parts |
| Polyethylene glycol (400) dimethacrylate (radically polymerizable monomer) | 5 parts |
| t-Butyl methacrylate (radically polymerizable monomer) | 35 parts |
| n-Pentyl methacrylate (radically polymerizable monomer) | 5 parts |
| n-Hexyl methacrylate (radically polymerizable monomer) | 5 parts |
| 2-Methyl-1-[4-(methylthio)phenyl]-2-morphorinopropane-1-one (photoradical generator) | 20 parts |
| Carbon black (colorant) | 3 parts |

The mixture was agitated by an agitator, and then subjected to a dispersing treatment using a supersonic dispersing machine, followed by filtering to prepare a black ink.

Thus, an ultraviolet crosslinking inkjet ink of Example 6 was prepared.

Example 7

The following components were mixed.

| | |
|---|---|
| Trimethylolpropane trimethacrylate (radically polymerizable monomer) | 100 parts |
| 2-Methyl-1-[4-(methylthio)phenyl]-2-morphorinopropane-1-one (photoradical generator) | 30 parts |

The mixture was agitated by an agitator to dissolve the photoradical generator in the radically polymerizable monomer.

Thus, an ultraviolet crosslinking inkjet ink of Example 7 was prepared.

The thus prepared ultraviolet crosslinking inkjet inks of Examples 1-7 and Comparative Example 1 were evaluated with respect to the following properties.

1. Stimulation Index (SI)

The stimulation index of some of radically polymerizable monomers used for ultraviolet crosslinking inkjet inks was measured by the LLNA method. The LLNA method is a skin sensitization test described in OECD Test Guideline 429. For example, as described in a paper, "Current Status and Novel Methodology for Detecting Skin Sensitization potential of Chemicals", in Functional Materials, vol. 25, No. 9 (September 2005), a material having a SI value of less than 3 is defined as negative with respect to the skin sensitization potential. In this regard, the smaller SI value a material has, the less skin sensitization potential the material has. Therefore, it is preferable to use a material having as small SI value as possible for the ultraviolet crosslinking inkjet ink of the present invention. Specifically, the SI value is preferably less than 3, more preferably less than 2, and even more preferably less than 1.6.

The method for measuring the skin sensitization potential of a material is the following.

(A) Materials and Equipments Used for Test (1) Materials to be Used for Test

The following materials were used for the test.

(1)-1 Materials to be Tested

Trimethylolpropane drimethacrylate, tricyclodecane dimethanol dimethacrylate, polyethylene glycol (400) dimethacrylate, polyethylene glycol (600) dimethacrylate, γ-butyrolactone methacrylate, and neopentyl glycol dimethacrylate were evaluated.

(1)-2 Positive Reference Material

α-Hexylcinnamaldehyde (HCA from Wako Pure Chemical Industries, Ltd.) was used as a positive reference material.

(1)-3 Medium

The following mixture was used as a medium for dispersing the test material or the positive reference material.

| | |
|---|---|
| Acetone (from Wako Pure Chemical Industries, Ltd.) | 4 parts by volume |
| Olive oil (Fujimi Pharmaceutical Co., Ltd.) | 1 part by volume |

(2) Animal Used for Test

Female mice with an age of from 7 to 8 weeks grown by Japan Charles River Atsugi Breeding center were obtained. The mice were subjected to naturalization for 8 days including medical inspection for 6 days. During the naturalization, the mice had been under good conditions. The mice were separated into eight groups (four mice per group) based on the weight thereof measured two days before the sensitization test using a random extraction method, so that the weight of individual mouse falls in a range of from ±20% of the average weight. Each of the mice was 8 to 9 weeks old at the start of the sensitization test. The mice excluded from the grouping were not subjected to the test.

During the test period, a mark was affixed to the tail of each of the mice using an oil ink to identify the mice. In addition, a label was attached to each of the breeding cages to identify the cages.

(3) Breeding Environment

The mice were bred in breeding rooms with a barrier system during the entire breeding period including the medical inspection period and the naturalization period. The mice were bred in several inspection cages during the medical inspection period, and after the medical inspection, the mice were bred in eight breeding cages. The conditions of the inspection cages and the breeding cages were as follows.

Temperature: 21 to 25° C.

Relative humidity: 40 to 70%

Ventilation: 10 to 15 times per hour

Light and dark cycle: 12-hour lighting followed by 12-hour lighting off (lighted at 7 o'clock and lighted off at 19 o'clock)

Each of the inspection cages is made of polycarbonate and has a size of 265 mm in width, 426 mm in depth and 150 mm in height, and each of the breeding cages is made of polycarbonate and has a size of 225 mm in width, 338 mm in depth and 140 mm in height. The inspection cages and the breeding cages are made by Tokiwa. After the grouping, four mice were bred in each breeding cage.

The food, which is a solid food MF for test animal (from Oriental Yeast Co., Ltd.), was supplied so that the mice could eat the food freely. Water, which is running water and to which sodium hydpochlorite (PURELOX from Oyalox Co., Ltd.) is added so that the amount of chlorine is about 5 ppm, was supplied using a feed water bottle so that the mice could drink the water freely. In addition, SUNFLAKE (shaving prepared by planing a fir tree with an electric plane and obtained from Japan Charles River) was applied to the floor of each cage. The food and the breeding equipments were subjected to sterilization for 30 minutes at 121° C. using an autoclave.

The cages and the shaving were changed at the grouping and at a time when the auricular lymph nodes were obtained from the mice (i.e., at a time when the mice were discharged from the breeding cages). In addition, the feed water bottles and racks were changed at the grouping.

(B) Sensitization Test Method (1) Grouping

| Test group | Material | Amount of the material used for test | Number of sensitization test performed | Number of mice used for test (number of animals) |
|---|---|---|---|---|
| Medium reference group | Medium only | 25 μl/ auricula | Once per day × 3 days | 4 mice (Nos. 1-4) |
| Positive reference group | 25% HCA | 25 μl/ auricula | Once per day × 3 days | 4 mice (Nos. 5-8) |
| Sample (1-6) | 50%(W/V %) | 25 μl/ auricula | Once per day × 3 days | 4 mice for each sample (Nos. 9-32) |

Sample 1: Trimethylolpropane trimacrylate
Sample 2: Tricyclodecane dimethanol dimethacrylate
Sample 3: Poyethylene glycol(400) dimethacrylate
Sample 4: Poyethylene glycol(600) dimethacrylate
Sample 5: γ-Butyrolactone methacrylate
Sample 6: Neopentyl glycol dimethacrylate (2) Preparation (2)-1 Preparation of Sample to be Tested About 0.5 g of each of the samples 1-6 to be tested, which was precisely weighed, was dissolved in the medium at a concentration of 50 w/v % (i.e., the total volume of the solution was 1 ml). Thus, sample solutions 1-6 were prepared. The samples solutions were contained in a light-resistant airtight glass container.

(2)-2 Preparation of Positive Reference Material Solution

About 0.5 g of the positive reference material HCA, which was precisely weighed, was dissolved in the medium at a concentration of 25 w/v % (i.e., the total volume of the solution was 1 ml). Thus, a positive reference material solution was prepared. The positive reference solution was also contained in a light-resistant airtight glass container.

(2)-3 Preparation of BrdU Solution

After about 0.2 g of 5-bromo-2'-deoxyuridine (BrdU, from Nacalai Tesque), which was precisely weighed, was fed into a flask, physiological saline was added thereto, and the mixture was subjected to a supersonic treatment to prepare a BrdU solution. The solution was diluted with physiological saline to have a volume of 20 ml, resulting in preparation of a BrdU solution having a concentration of 10 mg/ml. After the BrdU solution was subjected to a sterilization treatment using a sterilization filter, the BrdU solution was stored in a sterilization container.

(2)-4 Preparation Time and Storage Period

The positive reference material solution was prepared on the day before the start date of the sensitization test, and was stored in a cool place except for a time when the solution was used for the test. The medium and the sample solutions were prepared on the day when the sensitization test was performed. The BrdU solution was prepared two days before the day when the solution was used, and stored in a cool place before use.

(C) Sensitization Treatment and Supply of BrdU (1) Sensitization Treatment

All the sample solutions were applied in such a manner that a sample solution in an amount of 25 µl is applied to both auricles of each of mice in a group using a micro pipette. Similarly, the positive reference solution in an amount of 25 µl was applied to both auricles of each of mice in a group different from the above-mentioned groups using a micro pipette. Further, the medium in an amount of 25 µl was applied to both auricles of each of mice in another group different from the above-mentioned groups using a micro pipette. This operation was continuously performed for 3 days at a frequency of once a day.

(2) Supply of BrdU

At a time 48 hours after the last sensitization treatment, 0.5 ml of the BrdU solution was supplied to the abdominal cavity of each mouse. This operation was performed only once.

(D) Observation and Inspection (1) Observation of Physical Conditions of Mice

All the mice used for the test were visually observed once a day from the start date of the sensitization test to the day when the auricular lymph nodes were obtained from the mice (i.e., the day when the mice were discharged from the breeding cages). In this regard, the start date of the sensitization test was the first observation date.

(2) Weight Check of Mice

On the start date of the sensitization test and the day when the auricular lymph nodes were obtained from the mice (i.e., the day when the mice were discharged from the breeding cages), the weight of all the mice used for the test was checked. In addition, the average weight of the mice in each group and the standard deviation of the weight were calculated.

(3) Removal of Auricular Lymph Node and Weight Check of Auricular Lymph Node

At a time 24 hours after supply of the BrdU solution to the mice, the mice were subjected to easy death, and then the auricular lymph nodes were removed therefrom. After the peripheral tissues in the vicinity of the auricular lymph nodes were carefully removed, the weight of each auricular lymph node was checked. In addition, the average weight of the auricular lymph node of the mice in each group and the standard deviation of the weight were calculated. After the weight check, the auricular lymph nodes of each mouse were stored at −20° C. in a biomedical freezer so as to be in a frozen state while separated from those of the other mice.

(4) Measurement of Content of BrdU in Auricular Lymph Node

After a frozen auricular lymph node was allowed to settle in a place at room temperature, the auricular lymph node was ground while adding physiological saline thereto to prepare a suspension of the auricular lymph node. After the suspension was subjected to filtering, the suspension was injected into 3 wells of a micro plate (total number of the wells of the micro plate is 96), and the content of BrdU in the suspension was determined by an ELISA method. The reagent used for the analysis was a marketed kit (Cell Proliferation ELISA, BrdU colorimetric, Cat. No. 1647229, from Roche Diagnostics Japan). The absorbance ($OD_{370nm}$-$OD_{492nm}$, i.e., content of BrdU) of the auricular lymph node suspension was measured using a multiplate reader (FLUOstar OPTIMA, BMG LABTECH). The absorbances of the 3 wells was averaged to determine the average absorbance (i.e., content of BrdU).

(E) Evaluation (1) Calculation of Stimulation Index (SI)

The averaged BrdU content for a sample was divided by the averaged BrdU content for the medium reference to determine the stimulation index (SI) value of the sample. The SI values of the mice in a group were averaged to determined the stimulation index (SI) of the sample, and the standard deviation thereof was also calculated. In this regard, the SI value is calculated to one place of decimals by half adjust.

$$SI=(BrdUs)/(BrdUm),$$

wherein BrdUs represents the averaged content of BrdU for a sample (averaged value for 3 wells), and BrdUm represents the averaged content of BrdU for the medium reference (averaged value for four mice in the group).

A radically polymerizable monomer having a MSDS in which it is clearly described that the material has a negative skin sensitization potential, and a radically polymerizable monomer which is evaluated so as to have negative skin sensitization potential by the skin sensitization test method described in OECD Test Guideline 406 such as the maximization method and the Bucheler method are considered to satisfy the requirements for negative skin sensitization potential when evaluated by the LLNA method. Therefore, such radically polymerizable monomers can also be used for the ultraviolet crosslinking inkjet ink of the present invention.

As mentioned above, the PII value of a material is determined by the skin sensitization test method described in OECD Test Guideline 404 (Original Adoption; 12 May 1981, Most Recently Updated 24 Apr. 2002). The PII value of a material is often described in the MSDS of the material. The PII values of some of the radically polymerizable monomers are described above. When the PII value of a material is less than 2, the material is considered to have low skin sensitization potential.

2. Viscosity

The viscosity of each ultraviolet crosslinking inkjet ink was measured at temperatures of 25° C. (i.e., room temperature) and 60° C. (i.e., a typical temperature of a heatable printing head used for printers such as GEN4 from Ricoh Printing Systems, etc.) using a cone-plate type rotary viscometer from Toki Sangyo Co., Ltd. The viscosity of an ink is preferably not greater than 20 mP·s so that the ink can be satisfactorily ejected by commercialized inkjet printers having a heatable printing head. Each of the inks prepared above was evaluated whether or not to be ejected from a printing head at a temperature described in Table 2 below. As a result, it was found that all the inks can be ejected from the print head.

3. Crosslinking Property

Each ink was set in a heatable inkjet recording head, GEN4 from Ricoh Printing Systems, and a solid image was recorded on a marketed PET film with heating the recording head to 60° C. or without heating the recording head (i.e., at a temperature of 25° C.). In addition, the solid image was exposed to UV light emitted by LH6 from Fusion Systems Japan, wherein the integral amount of light in a UV-A wavelength region was changed so as to be 50, 100, 200, 500, 1,000, and 10,000 mJ/cm$^2$. It was judged that the solid image be crosslinked, if the solid image exposed to UV light is not damaged even when the image is touched with a finger. The crosslinking property of the ink is represented by the integral amount of light applied to the image until the image is crosslinked. Therefore, the smaller integral amount of light an ink has, the better crosslinking property the ink has. The integral amount of light used for crosslinking an ultraviolet crosslinking inkjet ink is preferably not greater than 1,000 mJ/cm$^2$ so that the ink can be practically used.

4. Solubility of Photoradical Generator in Ink

Before preparing an ink, a mixture of the photoradical generator and the radically polymerizable monomer component (without a colorant) was heated to 40° C. to dissolve the photoradical generator in the radically polymerizable monomer component, followed by cooling to room temperature. After cooling the ink, the mixture was visually observed to determine whether the mixture was transparent or opaque. The solubility of the photoradical generator was graded as follows.

◯: The mixture was transparent (i.e., the solubility of the photoradical generator is good).

Δ: The mixture was slightly opaque (i.e., the solubility of the photoradical generator is on an unacceptable level).

X: The mixture was opaque or had a precipitate (i.e., the solubility of the photoradical generator is bad).

The formulae of the ultraviolet crosslinking inkjet inks of Examples 1-7 and Comparative Example 1 are as described in Table 1 below.

TABLE 1

| Material | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| Trimethylolpropane trimethacrylate (SI value of 1.9, PII value of 0.0) | 100 | 100 | | | 100 | | 100 | |
| Tricyclodecane Dimethanol dimethacrylate (SI value of 1.3) | | | 30 | 50 | | 50 | | |
| Polyethylene glycol (600) dimethacrylate (SI value of 1.6) | | | 10 | | | | | |
| Polyethylene glycol (400) dimethacrylate (SI value of 1.3) | | | | | 5 | | 5 | |
| γ-Butyrolactone methacrylate (SI value of 2.1) | | | 50 | | | | | |
| Neopentyl glycol dimethacrylate (SI value of 2.0) | | | 10 | | | | | |
| t-Butyl methacrylate (negative skin sensitization material*[1]) | | | | 35 | | 35 | | |
| n-Pentyl methacrylate (negative skin sensitization material*[1]) | | | | 5 | | 5 | | |
| n-Hexyl methacrylate (negative skin sensitization material*[1]) | | | | 5 | | 5 | | |
| Trimethylolpropane triacrylate (positive skin sensitization material*[2], PII value of 3.0) | | | | | | | | 100 |
| 2-Methyl-1-[4-(methylthio)phenyl]-2-morphorinopropane-1-one (negative skin sensitization material*[3]) | 10 | 20 | 20 | 20 | 20 | 20 | 30 | 10 |
| Carbon black | | | | | | | 3 | 3 |

*[1]The material has a negative skin sensitization potential as described in Contact Dermatitis 8 223-235 (1982), etc. when evaluated by a maximization method.
*[2]The material is a positive skin sensitization material. It is described in Directive 67/548/EEC Annex III (which can be accessed from Ariel Webinsight) that the material has a grade R43, which means that the material has a positive skin sensitization potential.
*[3]It is described in the MSDS thereof that the material has no skin sensitization potential.

The evaluation results are shown in Table 2 below.

TABLE 2

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Viscosity (mP·s) | 25° C. | 74 | 125 | 110 | 8 | 140 | 10 | 160 | 78 |
| | 60° C. | 11 | 15 | 13 | 2 | 17 | 3 | 18 | 11 |
| Temp. of recording head (° C.) | | 60 | 60 | 60 | 25 (room temp.) | 60 | 25 (room temp.) | 60*[1] | 60 |
| Crosslinking property (mJ/cm$^2$) | | 10000 | 200 | 200 | 100 | 500 | 200 | 50*[1] | 50 |
| Solubility of photoradical generator | | ◯ | ◯ | ◯ | ◯ | ◯ | ◯ | Δ*[1] | ◯ |

*[1]The photoradical generator was precipitated in the ink at room temperature but was evenly dissolved at 60° C.

Therefore, the evaluation was performed while heating not only the print head but also the ink supply passage to 60° C.

Trimethylolpropane trimethacrylate used for Example 1 is the same as trimethylolpropane triacrylate used for Comparative Example 1 except that a methyl group is present on the α-position of the double bond thereof instead of a hydrogen atom. Although trimethylolpropane triacrylate used for Comparative Example 1 has good polymerizing ability and therefore can be crosslinked with a less amount of light, the monomer has high skin irritation potential and high skin sensitization potential, namely the monomer has high toxicity. In contrast, trimethylolpropane trimethacrylate used for Example 1 has low skin irritation potential and low skin sensitization potential, i.e., the material has low toxicity. Although trimethylolpropane trimethacrylate needs relatively high crosslinking energy compared to trimethylolpropane triacrylate, it can be fully crosslinked by increasing the integral amount of light to a certain extent.

It can be easily understood from comparison of Examples 1, 2 and 7 that by adding a proper amount of photoradical generator, the crosslinking property of a radically polymerizable monomer can be enhanced. In this regard, increasing the amount of a photoradical generator produces adverse effects such that the viscosity of the ink increases, and the solubility of the photoradical generator in the polymerizable monomer deteriorates. Therefore, the added amount of a photoradical generator is preferably not less than 5 parts by weight and less than 30 parts by weight based on 100 parts by weight of the radically polymerizable monomer component included in the ink. However, even when the added amount is 30 parts by weight or more, it is possible to well eject the ink by heating the print head and the ink supply passage.

In addition, it can be understood from Examples 3 and 4 that by choosing one or more proper methacrylates while properly determining the added amounts thereof, the properties of the resultant inks (such as viscosity and crosslinking property) can be optimized. Namely, by choosing one or more proper methacrylates while properly determining the added amounts thereof in consideration of the targeted qualities of images and the printing process of the inkjet printers, an ink suitable for the printers can be developed.

Further, it is possible to add a colorant to the ink like the inks of Examples 5 and 6. In general, the viscosity of a radically polymerizable monomer including a colorant is higher than the viscosity of the monomer itself. In addition, since such a colorant tends to absorb or scatter light emitted from a light source for crosslinking the ink, the crosslinking property of the ink tends to be deteriorated. However, it can be understood from Examples 5 and 6 that the ultraviolet crosslinking inkjet inks of the present invention including a colorant can be satisfactorily ejected by a print head without problem.

Additional modifications and variations of the present invention are possible in light of the above teachings. It is therefore to be understood that within the scope of the appended claims the invention may be practiced other than as specifically described herein.

What is claimed is:

1. An ultraviolet crosslinking inkjet ink comprising:
    a radically polymerizable monomer including a methacrylate and no acrylate; and
    a photoradical generator,
    wherein the ink produces lower skin sensitiziation as compared to an ink in which the methacrylate is replaced with the corresponding acrylate.

2. The ultraviolet crosslinking inkjet ink according to claim 1, wherein the methacrylate has a Stimulation Index value of less than 3.

3. The ultraviolet crosslinking inkjet ink according to claim 1, wherein the methacrylate includes at least one member selected from the group consisting of tricyclodecane dimethanol dimethacrylate, polyethylene glycol (400) dimethacrylate, polyethylene glycol (600) dimethacrylate, trimethylolpropane trimethacrylate, γ-butyrolactone methacrylate, neopentyl glycol dimethacrylate, t-butyl methacrylate, n-pentyl methacrylate, and n-hexyl methacrylate.

4. The ultraviolet crosslinking inkjet ink according to claim 1, wherein the photoradical generator is included in the ultraviolet crosslinking inkjet ink in an amount of not less than 5 parts by weight and less than 30 parts by weight based on 100 parts by weight of the radically polymerizable monomer.

5. The ultraviolet crosslinking inkjet ink according to claim 1, wherein the ultraviolet crosslinking inkjet ink has a viscosity of not higher than 20 mP·s at 60° C.

6. The ultraviolet crosslinking inkjet ink according to claim 1, wherein the ultraviolet crosslinking inkjet ink is crosslinked by ultraviolet light in an integral amount of light not greater than 10,000 mJ/cm$^2$.

7. The ultraviolet crosslinking inkjet ink according to claim 1, further comprising:
    a colorant.

8. An ink cartridge comprising:
    the ultraviolet crosslinking inkjet ink according to claim 1; and
    a container containing the ultraviolet crosslinking inkjet ink therein.

9. An image forming method comprising:
    ejecting droplets of the ultraviolet crosslinking inkjet ink according to claim 1 toward a recording material to form an image on the recording material; and
    irradiating the image with ultraviolet light to crosslink the image.

10. An image forming apparatus comprising:
    a recording device to eject droplets of the ultraviolet crosslinking inkjet ink according to claim 1 toward a recording material to form an image on the recording material; and
    an ultraviolet irradiator to irradiate the image with ultraviolet light to crosslink the image.

* * * * *